United States Patent
Palamadai et al.

(10) Patent No.: US 12,314,681 B2
(45) Date of Patent: May 27, 2025

(54) GENERATING PERSONALIZED LANGUAGES FOR EXTENDED REALITY COMMUNICATION

(71) Applicant: AT&T Intellectual Property I, L.P., Atlanta, GA (US)

(72) Inventors: Rashmi Palamadai, Naperville, IL (US); Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 347 days.

(21) Appl. No.: 18/088,516

(22) Filed: Dec. 23, 2022

(65) Prior Publication Data
US 2024/0211705 A1 Jun. 27, 2024

(51) Int. Cl.
*G06F 40/58* (2020.01)
*G06F 3/01* (2006.01)

(52) U.S. Cl.
CPC .............. *G06F 40/58* (2020.01); *G06F 3/011* (2013.01); *G06F 3/016* (2013.01); *G06F 3/017* (2013.01)

(58) Field of Classification Search
CPC .......... G06F 40/58; G06F 3/011; G06F 3/016; G06F 3/017
See application file for complete search history.

(56) References Cited

U.S. PATENT DOCUMENTS

| | | | |
|---|---|---|---|
| 8,631,355 B2 | 1/2014 | Murillo et al. | |
| 2008/0163130 A1* | 7/2008 | Westerman | G06F 3/04883 715/863 |
| 2010/0149090 A1* | 6/2010 | Morris | H04L 67/01 345/156 |
| 2010/0306261 A1* | 12/2010 | Geisner | G06F 3/011 715/863 |
| 2013/0074014 A1* | 3/2013 | Ouyang | G06F 3/04883 715/863 |
| 2015/0309580 A1* | 10/2015 | Kumar | G06F 3/017 345/156 |

(Continued)

OTHER PUBLICATIONS

Wobbrock, Jacob O., Meredith Ringel Morris, and Andrew D. Wilson. "User-defined gestures for surface computing." Proceedings of the SIGCHI conference on human factors in computing systems. 2009. (Year: 2009).*

(Continued)

*Primary Examiner* — Brian L Albertalli (57) ABSTRACT

In one example, a method includes creating a user group in an extended reality application, creating a language library for the user group, where the language library includes a plurality of gestures and a plurality of corresponding meanings, launching a session of the extended reality application for the user group, presenting the language library in the session of the extended reality application, monitoring communications among the user group during the session of the extended reality application, presenting, when an error is detected during the monitoring, a correction to a member of the user group who made the error, where the correction shows the member how to correct the error in a manner that is consistent with the language library, and adding, when a new gesture is detected during the monitoring, the new gesture and a corresponding meaning for the new gesture to the language library.

20 Claims, 3 Drawing Sheets

(56) References Cited

U.S. PATENT DOCUMENTS

| | | | | |
|---|---|---|---|---|
| 2016/0026252 | A1* | 1/2016 | McCoy | G06V 10/772 |
| | | | | 345/156 |
| 2016/0187992 | A1* | 6/2016 | Yamamoto | G06F 3/017 |
| | | | | 345/156 |
| 2017/0315824 | A1* | 11/2017 | Ochiai | G06F 9/453 |
| 2018/0130556 | A1* | 5/2018 | Dobai | G16H 80/00 |
| 2019/0011989 | A1* | 1/2019 | Schwesig | G01S 13/66 |
| 2019/0138105 | A1* | 5/2019 | Ragupathy | G06F 3/017 |
| 2019/0147367 | A1* | 5/2019 | Bellamy | G06N 20/00 |
| | | | | 706/12 |
| 2019/0324553 | A1* | 10/2019 | Liu | G06F 16/3344 |
| 2019/0379765 | A1* | 12/2019 | Fajt | A63F 13/55 |
| 2020/0301512 | A1* | 9/2020 | Davies | G06V 40/28 |
| 2023/0101696 | A1* | 3/2023 | Banerjee | G06V 40/28 |
| | | | | 434/112 |
| 2023/0128422 | A1* | 4/2023 | Li | G10L 15/24 |
| | | | | 345/156 |
| 2024/0169696 | A1* | 5/2024 | Stewart | G06V 10/764 |

OTHER PUBLICATIONS

Mauney, Dan, et al. "Cultural similarities and differences in user-defined gestures for touchscreen user interfaces." CHi'10 extended abstracts on human factors in computing systems. 2010. 4015-4020. (Year: 2010).*

Joshi, Ajjen, et al. "Personalizing gesture recognition using hierarchical bayesian neural networks." Proceedings of the IEEE Conference on Computer Vision and Pattern Recognition. 2017. (Year: 2017).*

Lin, D.; Murakami, Y.; Ishida, T. Towards Language Service Creation and Customization for Low-Resource Languages. Information 2020, 11, 67. https://doi.org/10.3390/info11020067.

* cited by examiner

GENERATING PERSONALIZED LANGUAGES FOR EXTENDED REALITY COMMUNICATION

The present disclosure relates generally to extended reality applications, and relates more particularly to devices, non-transitory computer-readable media, and methods for generating personalized languages for extended reality communication.

BACKGROUND

Extended reality (XR) is an umbrella term that encompasses various types of technology including virtual reality (VR), augmented reality (AR), mixed reality (MR), and other technologies. Most forms of XR technology involve interaction with digitally created virtual objects, which may be presented in a digitally created virtual environment or inserted into a real word environment (e.g., via a digital overlay). XR technology has grown in popularity in recent years and has become commonplace in fields such as gaming, entertainment, professional training/simulation exercises, and other fields.

SUMMARY

In one example, the present disclosure describes a device, computer-readable medium, and method for generating personalized languages for extended reality communication. For instance, in one example, a method performed by a processing system including at least one processor includes creating a user group in an extended reality application, creating a language library for the user group, where the language library includes a plurality of gestures and a plurality of corresponding meanings, launching a session of the extended reality application for the user group, presenting the language library in the session of the extended reality application, monitoring communications among the user group during the session of the extended reality application, presenting, when an error is detected during the monitoring, a correction to a member of the user group who made the error, where the correction shows the member how to correct the error in a manner that is consistent with the language library, and adding, when a new gesture is detected during the monitoring, the new gesture and a corresponding meaning for the new gesture to the language library.

In another example, a non-transitory computer-readable medium stores instructions which, when executed by a processing system, including at least one processor, cause the processing system to perform operations. The operations include creating a user group in an extended reality application, creating a language library for the user group, where the language library includes a plurality of gestures and a plurality of corresponding meanings, launching a session of the extended reality application for the user group, presenting the language library in the session of the extended reality application, monitoring communications among the user group during the session of the extended reality application, presenting, when an error is detected during the monitoring, a correction to a member of the user group who made the error, where the correction shows the member how to correct the error in a manner that is consistent with the language library, and adding, when a new gesture is detected during the monitoring, the new gesture and a corresponding meaning for the new gesture to the language library.

In another example, a device includes a processing system including at least one processor and a computer-readable medium storing instructions which, when executed by the processing system, cause the processing system to perform operations. The operations include creating a user group in an extended reality application, creating a language library for the user group, where the language library includes a plurality of gestures and a plurality of corresponding meanings, launching a session of the extended reality application for the user group, presenting the language library in the session of the extended reality application, monitoring communications among the user group during the session of the extended reality application, presenting, when an error is detected during the monitoring, a correction to a member of the user group who made the error, where the correction shows the member how to correct the error in a manner that is consistent with the language library, and adding, when a new gesture is detected during the monitoring, the new gesture and a corresponding meaning for the new gesture to the language library.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure generates personalized languages for extended reality communication. As discussed above, XR technology has grown in popularity in recent years and has become commonplace in fields such as gaming, entertainment, professional training/simulation exercises, and other fields. As XR equipment and communications become more prevalent and more sophisticated, certain gestures associated with controlling the equipment may become more universal, in much the same way that certain gestures for controlling other technology have become universal (e.g., pinching the thumb and forefinger together to zoom out on an image, or tapping twice with the forefinger to open a document, on a touchscreen display).

Similarly, communication often involves gestures as well as spoken language. For instance, tapping one's wrist (e.g., as though tapping the face of an invisible watch) may indicate that time is running out for a particular task. Communicative gestures may also include tactile sensations, such as tapping another person's shoulder to encourage them to speak up or gently kicking someone under a table to warn them to stop speaking.

While some gestures may be universally understood, other gestures may be unique to individuals or groups of individuals. For instances, some groups of individuals may use specific unique gestures to communicate without being understood by others. Moreover, with XR technology in particular, the meanings of gestures may evolve over time, and new gestures may be developed.

Examples of the present disclosure may learn and subsequently "teach" a gesture-based language in an XR environment. In one example, the language may build off universally understood gestures while also including gestures that are customized to a specific group of users. Gestures may be learned, and meanings associated with the gestures can be used to build a language, through observation of the group of users. When new members join the group of users, the new members' gestures may be observed and corrected (when necessary) to ensure consistency with the established language.

A gesture-based language that is generated in such a manner may be especially useful in XR environments. For instance, individuals who are interacting in an XR environment (and are able to view each of the controllable digital representations of each other, such as avatars) may use the gesture-based language to communicate with each other in the XR environment. This may allow groups of users to create a personalized "code" language in order to communicate with each other privately in a public or semi-public space. A gesture-based language may also facilitate communication in situations where one or more individuals may be hard of hearing, may have a speech delay or impairment, or may speak a different language from other individuals. These and other aspects of the present disclosure are described in greater detail below in connection with the examples of FIGS. 1-3.

Figure 1:
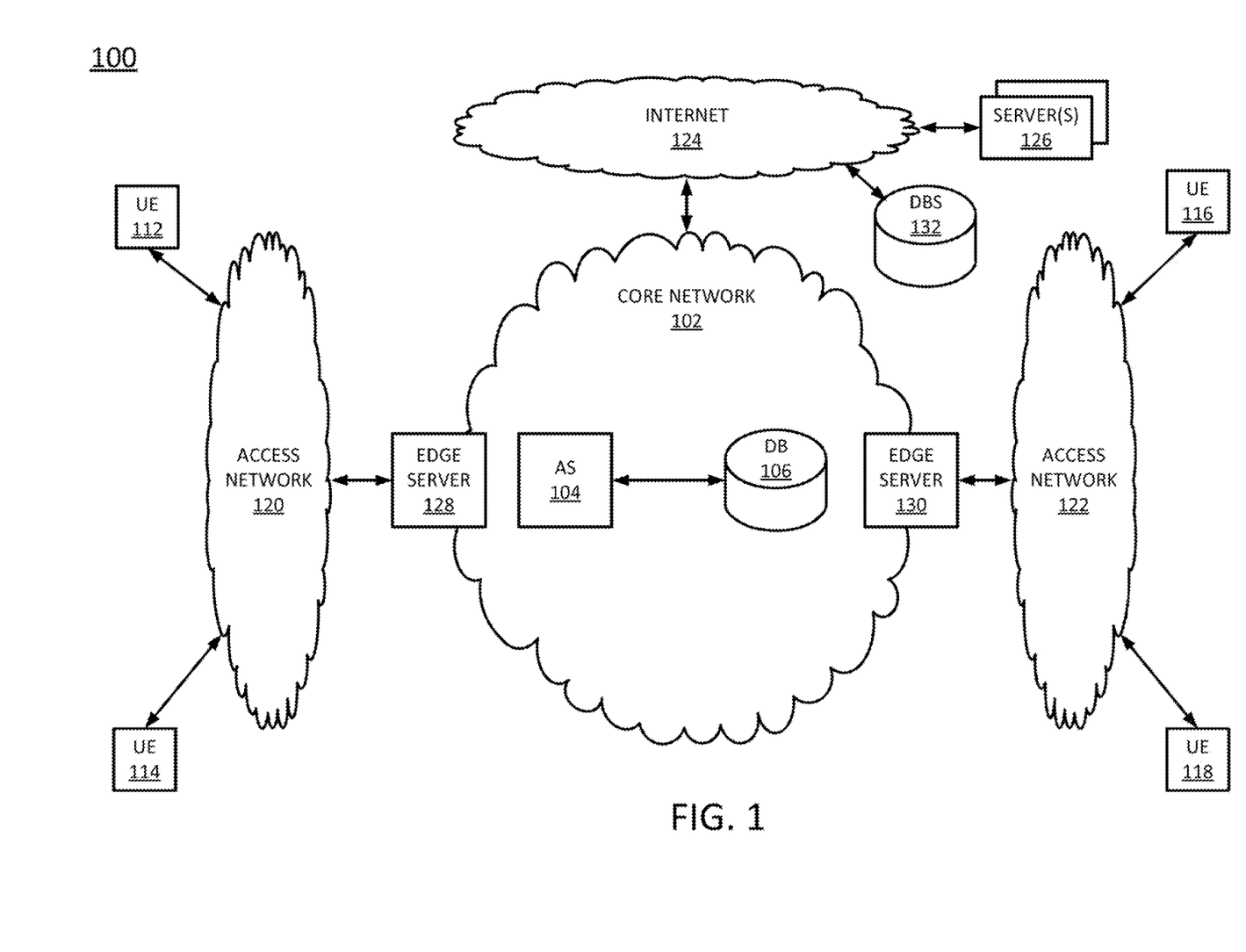
FIG. 1 illustrates an example system in which examples of the present disclosure may operate.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VOIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, a media streaming server, an advertising server (AS), an interactive TV/video on demand (VOD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 3:
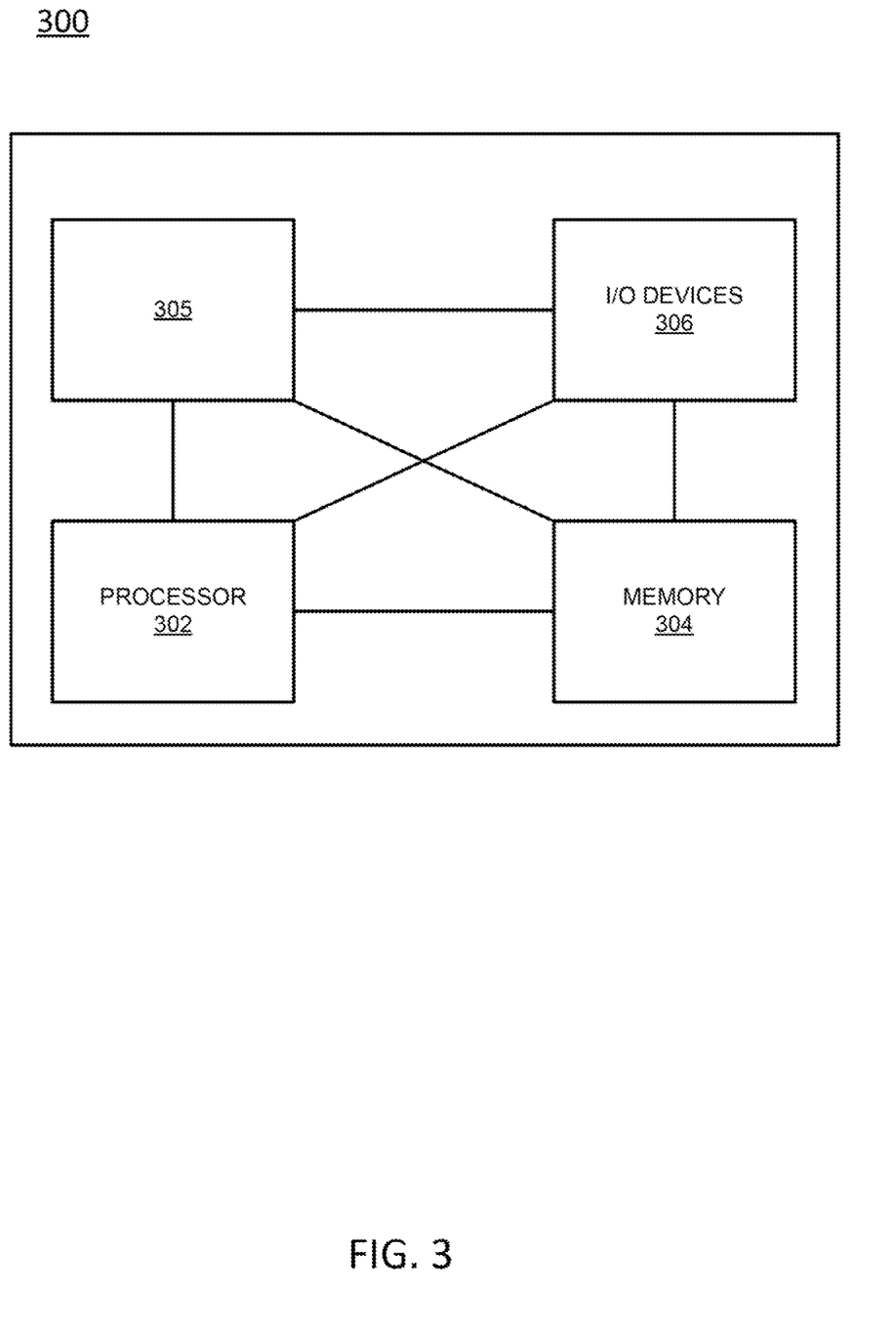
FIG. 3 depicts a high-level block diagram of a computing device specifically programmed to perform the functions described herein.

In accordance with the present disclosure, network 102 may include an application server (AS) 104, which may comprise computing system or server, such as computing system 300 depicted in FIG. 3, and may be configured to provide one or more operations or functions in connection with an extended reality application. For instance, the AS 104 may support a service that streams immersive video, provides an XR gaming experience, or simulates a professional training scenario (e.g., for first responders, vehicle operators, or the like). The network 102 may also include one or more databases (DBs) 106 that are communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. Thus, although only a single application server (AS) 104 and a single database (DB) 106 are illustrated in FIG. 1, it should be noted that any number of servers and any number of databases may be deployed, and which may operate in a distributed and/or coordinated manner as a processing system to perform operations in connection with the present disclosure.

In one example, AS 104 may comprise a centralized network-based server for generating an XR environment.

For instance, the AS 104 may host an XR application such as a virtual conferencing application, an XR gaming application, a professional training or simulation application, or another type of immersive application. As part of the XR application, or as a separate service, the AS 104 assists users in generating personalized, gesture-based language libraries for use in XR environments.

In one example, the personalized, gesture-based language library may comprise a library of gestures, where each gesture is associated with a meaning (e.g., a word or phrase that is indicated by use of the gesture). In one example, the meanings associated with the gestures may be unique to a particular group of users. For instance, for a first group of users, a thumbs up gesture may mean "I agree," while the same thumbs up gesture may mean "good job" to a second group of users. A group of users using a common gesture-based language library may comprise a group of family members, a group of friends, a group of coworkers, or the like.

In one example, the AS 104 may assist a group of users in developing a personalized, gesture-based language library for the group. For instance, the personalized, gesture-based language library for the group may start with a default language library that includes a plurality of gestures and universally or commonly understood meanings for the plurality of gestures. The AS 104 may guide the group of users to modify the meanings associated with the plurality of gestures, and/or to add new gestures with meanings that are unique to the group of users to the language library. In this way, the default language library may evolve into a personalized language library for the group of users. The personalized language library may be designed for specific use cases (e.g., a specific XR game, a video conferencing application, or the like) and/or specific users (e.g., users who speak different languages, have speech impairments, or the like).

In further examples, the AS 104 may help a group of users to learn the meanings that correspond to the gestures in the personalized language library that is created for the group of users. For instance, the AS 104 may present a tutorial or a legend or key that assists the users in learning which gestures correspond to which meanings. The AS 104 may also monitor communications among the group of users and may correct the users when they use a gesture incorrectly. In this way, the AS 104 may help the users to "learn to speak" the language of the personalized language library. This may be useful for acquainting a group of users with a newly created language library, and also for helping new users who have joined the group of users to learn how to communicate with the other users in the group.

In one example, the AS 104 may further comprise a physical storage device (e.g., a database server) to store profiles users. For instance, a profile for a user may indicate a name or identity of the user, contact information (e.g., email address, mobile phone number, username for an XR application, or the like), user groups to which the user belongs, the user's relationships to other members of those user groups, personalized language libraries associated with those user groups, personalized language libraries that the user has contributed to the development of, communication preferences and/or limitations of the user, and/or other information about the user.

In one example, the DB 106 may store the profiles, and the AS 104 may retrieve the profiles from the DB 106 when needed. In further examples, the DB 106 may store the personalized language libraries, and the AS 104 may retrieve the personalized language libraries from the DB 106 when needed to support an XR application. For ease of illustration, various additional elements of network 102 are omitted from FIG. 1.

Figure 2:
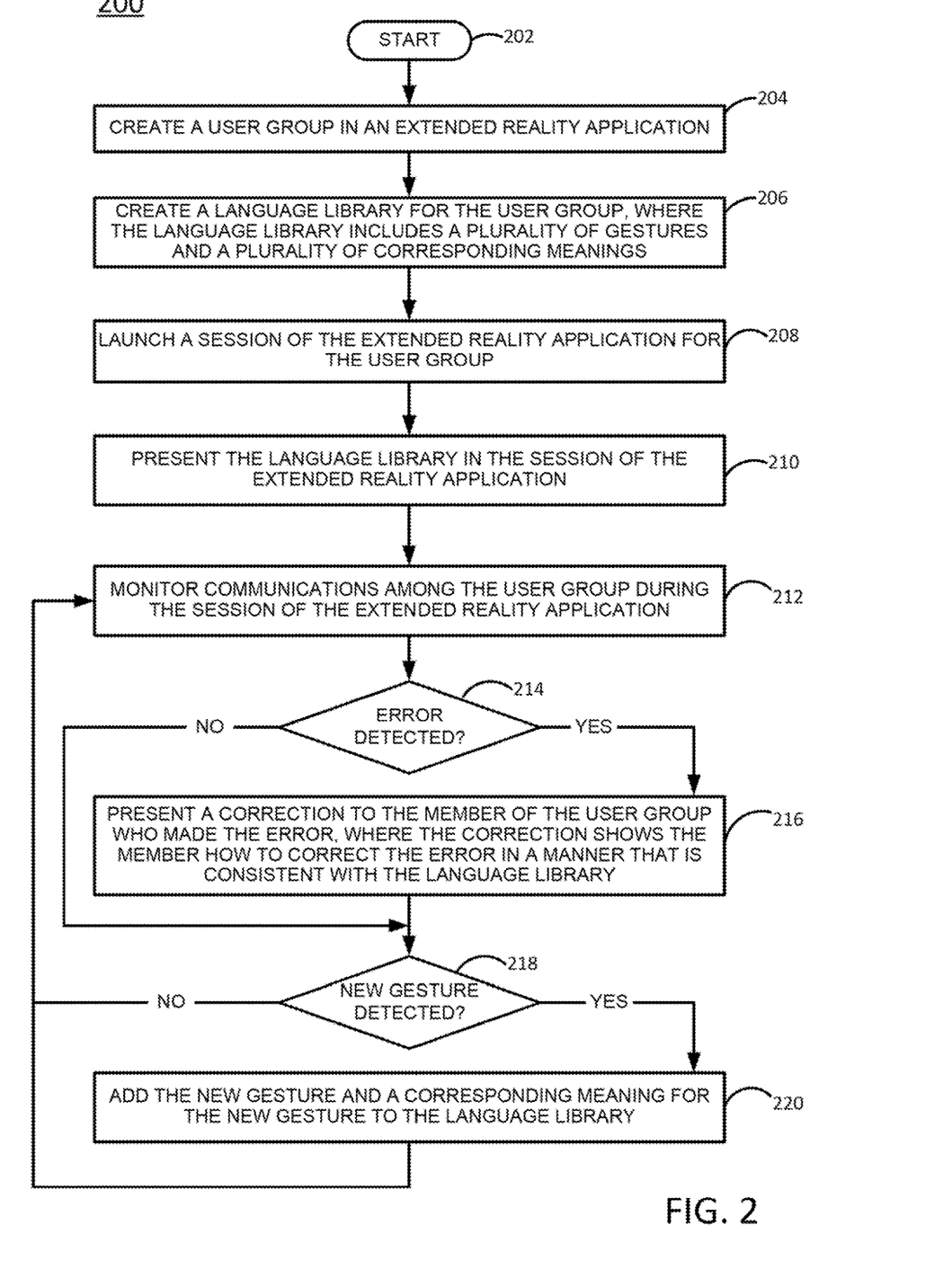
FIG. 2 illustrates a flowchart of an example method for generating personalized languages for extended reality communication, in accordance with the present disclosure.

In one example, core network may include one or more edge servers 128 and 130, each of which may comprise a computing system or server, such as computing system 300 depicted in FIG. 3, and may be configured to provide one or more operations or functions for generating personalized languages for extended reality communication, as described herein. For instance, an example method 200 for generating personalized languages for extended reality communication is illustrated in FIG. 2 and described in greater detail below.

In one example, AS 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 118 and/or 130 may be instantiated on one or more servers hosting virtualization platforms for managing one or more virtual machines (VMs), containers, microservices, or the like. In other words, in one example, edge servers 128 and/or 130 may comprise a VM, a container, or the like.

In one example, the access network 120 may be in communication with a server 126 and with one or UEs, e.g., UEs 112 and 114. Similarly, access network 122 may be in communication with UEs, e.g., UEs 116 and 118. Access networks 120 and 122 may transmit and receive communications between server 126, user endpoint devices 112, 114, 116, and 118, application servers (AS) 104, other components of network 102, devices reachable via the Internet in general, and so forth. In one example, any or all of the UEs 112, 114, 116, and 118 may comprise a mobile device, a cellular smart phone, a wearable computing device (e.g., smart glasses, smart goggles, a virtual reality (VR) headset or other types of head mounted display, or the like), a laptop computer, a tablet computer, or the like. In one example, any or all of the UEs 112, 114, 116, and 118 may comprise a computing system or device, such as computing system 300 depicted in FIG. 3, and may be configured to provide one or more operations or functions in connection with examples of the present disclosure for generating personalized languages for extended reality communication, as described herein. For instance, an example method 200 for generating personalized languages for extended reality communication is illustrated in FIG. 2 and described in greater detail below.

In one example, the core network 102 may be further connected to the Internet 124. Via the Internet 124, the core network 102 may have further access to server(s) 126 and DBs 132.

In one example, server(s) 126 may comprise a network-based server or servers for generating personalized languages for extended reality communication, as described herein. In this regard, server 126 may comprise the same or similar components as those of AS 104 and may provide the same or similar functions. Thus, any examples described herein with respect to AS 104 may similarly apply to server 126, and vice versa. In particular, server 126 may be a component of a system for generating personalized languages for extended reality communication which is operated by an entity that is not a telecommunications network operator. For instance, a provider of an immersive application may operate server 126 and may also operate edge servers 128 and/or 130 in accordance with an arrangement with a telecommunication service provider offering edge computing resources to third-parties. However, in another example, a telecommunication network service provider may operate network 102 and access network 122, and may also provide a system via AS 104 and edge servers 128 and/or 130. For instance, in such an example, the system embodied in the AS 104 may comprise an additional service that may be offered to subscribers, e.g., in addition to network access services, telephony services, traditional television services, media content delivery services, media streaming services, and so forth.

DBs 132 may function in a manner similar to DB 106 and may store user profiles and/or personalized language libraries as discussed above.

In an illustrative example, an immersive network connected application may be provided via AS 104 and edge servers 128 and/or 130. In one example, a user may engage the network connected application via software installed on a user endpoint device 112, 114, 116, or 118 to establish one or more sessions with the immersive network connected application, e.g., a connection to edge server 128 and/or 130 (or a connection to edge servers 128 and/or 130 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint devices 116 and 118 and edge servers 128 and/or 130 may involve cellular communication via one or more base stations (e.g., eNodeBs, gNBs, or the like). However, in another example, the communications may alternatively or additionally be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint devices 116 and 118 may communicate with access network 122, network 102, the Internet in general, etc., via a WLAN that interfaces with access network 122.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 126, or may be provided by AS 104 in conjunction with server 126. For instance, AS 104 and server 126 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 2 illustrates a flowchart of an example method 200 for generating personalized languages for extended reality communication in accordance with the present disclosure. In particular, the method 200 provides a method by which a device such as an application server may create a personalized language library (comprising a plurality of gestures and corresponding meanings for the gestures) for a group of users who communicate within an extended reality application. In one example, the method 200 may be performed by an application server, such as the AS 104 illustrated in FIG. 1. However, in other examples, the method 200 may be performed by another device, such as the processor 302 of the system 300 illustrated in FIG. 3. For the sake of example, the method 200 is described as being performed by a processing system.

The method 200 begins in step 202. In step 204, the processing system may create a user group in an extended reality application.

In one example, the user group may be created under the direction of a first member of the user group. For instance, the processing system may present a wizard to the first member that guides the first member through the creation of the user group.

In one example, the user group may be created for a specific need indicated by the first member. For instance, the first member may indicate a need to create a user group for family members, for coworkers, for members of a group or club, or for some other purpose. In one example, the processing system may add members to the user group (i.e., members in addition to the first member) by suggesting individuals from the first member's contacts. For instance, if the user group is created for family members of the first member, then the processing system may identify those of the first member's contacts who are labeled as "family," and may suggest adding those contacts to the user group. In another example, the first member may provide contact information (e.g., mobile phone numbers, email addresses, user names for an extended reality application, etc.) for the members who the first member would like to add to the user group.

In one example, creating the user group may include creating a profile for each member of the user group. In one example, the profile for a member of the user group may identify at least contact information for the member (e.g., mobile phone number, email address, user name for an extended reality application, etc.). In a further example, the profile for the member may identify additional information about the member, such as one or more of: name, age (e.g., age in years, or age range or category such as "under 12," "12-18," "child," "adult," etc.), language(s) spoken, relationships to other members of the user group (e.g., friend, child, coworker, etc.), or communication limitations (e.g., non-verbal, hearing impairment, vision impairment, etc.)

In step 206, the processing system may create a language library for the user group, where the language library includes a plurality of gestures and a plurality of corresponding meanings.

As discussed above, the language library includes a plurality of gestures. For instance, the plurality of gestures may include hand gestures, facial expressions, body gestures, or the like (e.g., thumbs up, frowning, a silly dance move, etc.). Each gesture of the plurality of gestures may be associated with one corresponding meaning of the plurality of corresponding meanings. For instance, the corresponding meaning of a "thumbs up" gesture may be that the person giving the thumbs up agrees with something someone else just said (e.g., "I agree"). The corresponding meaning of a silly dance move may be that the person doing the silly dance move is tired (e.g., "I am tired.").

In one example, an initial version of the language library may be created that utilizes a default plurality of gestures and plurality of corresponding meanings. The default plurality of gestures and plurality of corresponding meanings may comprise a plurality of gestures that are believed to have universally understood meanings (e.g., nodding one's head to indicate "yes," giving a "thumbs up" to indicate agreement). In one example, the initial version of the language library may be selected from a plurality of default language libraries, where each language library of the plurality of default language libraries is customized or targeted to a different use case or user group. For instance, one default language library may include gestures that are customized for a specific video game, while another default language library may omit gestures that may be unsuitable for user groups that include children.

In a further example, a default language library may serve merely as a starting point for the language library. The first member may further customize a selected default language library for use by the user group. For instance, if the language library is to be used for communications among members of an immediate family (e.g., parents, children, and/or grandparents), then the language library may be customized to include gestures for meanings or phrases that are commonly used by the members of the immediate family (e.g., a gesture for "Please pick up milk" or "What time will you be home?"). As another example, if the language library is to be used for communications among employees of a workplace, then the language library may be customized to include gestures for meanings or phrases that are commonly used by the employees (e.g., "What is the deadline?" or "Are you available for a meeting?"). As another example, if the language library is to be used for communications among a team playing a cooperative video game together, then the language library may be customized to include gestures for meanings or phrases that are commonly used by the members of the team (e.g., "I have a suggested strategy." or "Which way should we go?").

In one example, any time a member of the user group adds a customized gesture and corresponding meaning to the language library, the processing system may record details of the addition, such as which user created the addition, when the addition was created, a context under which the addition was created (e.g., during a communication session, after a communication session has ended, etc.).

In some examples, the plurality of corresponding meanings for the plurality of gestures may be mapped to a plurality of languages. For instance, the language library may provide a corresponding meaning for a gesture as a phrase that is stated in two or more different languages. The two or more different languages may be selected based on the languages spoken by the members of the user group. In a further example, at least one gesture of the plurality of gestures may be further associated with a haptic output. For instance, a tapping gesture may correspond to a meaning that the user doing the tapping wishes to get another user's attention. The tapping gesture may be further associated with the generation of a haptic output delivered to the another user's endpoint device to simulate being tapped on the shoulder.

In step 208, the processing system may launch a session of the extended reality application for the user group.

In one example, the extended reality application may comprise any application that presents an extended reality environment in which the members of the user group may communicate. The extended reality application may present real time images of the members of the user group in the extended reality environment, or the extended reality application may present controllable digital representations (e.g., avatars) of the members of the user group in the extended reality environment. Thus, the members of the user group may have some control over how their representations look, sound, and behave in the extended reality environment. In one example, the extended reality application may be one or more of: a virtual conferencing application, a gaming application, a training or simulation application, or another type of XR application.

In step 210, the processing system may present the language library in the session of the extended reality application.

For instance, in one example, the processing system may present a tutorial or "cheat sheet" to help the members of the user group start communicating using the language library. As an example, the processing system may present a legend or key that shows the top n most frequently used gestures and those gestures' corresponding meanings. The legend or key could be expanded upon request from a user to show additional gestures and the additional gestures' corresponding meanings. The legend or key could also be hidden upon request from a user. In one example, each user or member of a user group may be able to control whether the legend is presented on his or her display and how many gestures are presented. Thus, one member of the user group may elect to always keep the legend visible (e.g., to the side of the member's display), while another member of the user group may elect to hide the legend and only ask for the legend to be displayed upon request.

In another example, the processing system may present a series of gestures to the members of the user group and may ask the members of the user group to repeat the gestures. The processing system may also present a meaning for a particular gesture, and then ask the members of the user group to perform the gesture that corresponds to the presented meaning (e.g., "Show the gesture that means 'I need to pause.'").

In step 212, the processing system may monitor communications among the user group during the session of the extended reality application.

For instance, the processing system may monitor the communications among the user group in order to detect when the members of the user group perform gestures. The processing system may verify that the gestures map to corresponding meanings in the language library. The processing system may also monitor for requests from members of the user group, such as requests to view portions of the language library or to translate another user's gesture.

In step 214, the processing system may determine whether an error has been detected in the communications among the user group, where the error comprises a communication that is inconsistent with the language library.

As discussed above, the error may comprise a member of the user group making a gesture in a manner that is inconsistent with the language library. For instance, the user may have meant to make a particular gesture, but performed the gesture incorrectly (e.g., pointing upward instead of to the side, using their left hand instead of their right hand, etc.). In another example, the user may have made a gesture that is not mapped to any corresponding meaning in the language library, or does not exist in the language library.

In one example, an error may be detected when a detected gesture does not map to a meaning in the language library. In another example, an error may be detected when the meaning that is mapped to a detected gesture in the language library appears to be contextually inappropriate (e.g., one member of the user group asks if a game can be paused, and another member of the user group performs a gesture that means "Can you please pick up the dry cleaning?"). In another example, an error may be detected when one or more other members of the user group indicate that they do not understand a detected gesture.

If the processing system concludes in step 214 that an error has been detected in the communications among the user group, then the method 200 may proceed to step 216. In step 216, the processing system may present a correction to a member of the user group who made the error, where the correction shows the member how to correct the error in a manner that is consistent with the language library.

For instance, if the processing system is able to infer the gesture that the member intended to make, then the correction may verify the gesture that the user intended to make and/or may show the member how to perform the intended gesture properly (e.g., "Did you mean to say "rock and roll?" If so, tuck in your thumb instead of sticking your thumb out."). If the processing system is unable to infer the gesture that the member intended to make, then the processing system may ask the member to provide the intended meaning (e.g., by speaking the intended meaning or typing the intended meaning into a keyboard or touch screen). The processing system may then present the gesture in the language library that most closely maps to the intended meaning.

In one example, a machine learning technique, such as a deep learning technique, may be used to help determine when errors occur and to help determine how detected errors can be corrected. Once the correction has been presented, the method 200 may proceed to step 218.

If, however, the processing system concludes in step 214 that an error has not been detected in the communications among the user group, then the method 200 may proceed directly to step 218 (e.g., bypassing step 216). In step 218, the processing system may determine whether a new gesture has been detected in the communications among the user group.

In one example, a new gesture may be detected the first time that the processing system detects a member of the user group using a gesture that is not mapped to a corresponding meaning in the language library (e.g., does not currently exist in the language library). In another example, a new gesture may be detected when the processing system detects a gesture that is not mapped to a corresponding meaning in the language library being used a predefined threshold number of times and/or by a predefined threshold number of members of the user group (e.g., this gesture has been performed three times, or two different users have performed this gesture). Repetitive use of a gesture that is not mapped to a corresponding meaning in the language library may indicate that members of the user group associate some common meaning with the gesture. For instance, the gesture may be associated with a specific sports team that members of the user group follow, or may be a reference to a movie that members of the user group recently watched.

In one example, a machine learning technique, such as a deep learning technique, may be used to help determine when a new gesture has been detected and what the corresponding meaning of the new gesture may be.

If the processing system concludes in step 218 that a new gesture has been detected in the communications among the user group, then the method 200 may proceed to step 220. In step 220, the processing system may add the new gesture and a corresponding meaning for the new gesture to the language library.

As such, the language library may be considered a dynamic and evolving library of gestures. At any time, a new gesture and a corresponding meaning for the new gesture may be added to the language library. In one example, the processing system may solicit approval and review from members of the user group before adding the new gesture to the language library. For instance, the processing system may present a recording of one of the members of the user group performing the gesture, along with an inferred meaning for the gesture. The processing system may ask the members of the user group to verify the inferred meaning for the gesture (or to provide the intended meaning for the gesture, if the inferred meaning is incorrect). Once the intended meaning for the new gesture has been verified, the processing system may ask whether the new gesture should be added to the language library. Addition of the new gesture to the language library may require the approval of a specific user who is designated as the administrator for the language library, or the approval of a predefined threshold number of members of the user group (e.g., at least x members, or at least y percent of the user group).

In some examples, when a new gesture is added to the language library, the processing system may pause the extended reality application in order to teach the new gesture to the members of the user group (e.g., similar to step 210). In other examples, a key or legend that is presented to the members of the user group may include a section specifically for showing the z most recently added gestures, so that newly added gestures can be easily identified and reviewed.

Once the new gesture and its corresponding meaning have been added to the language library, the method 200 may return to step 212 and proceed as described above to monitor the communications among the user group.

If, however, the processing system concludes in step 218 that a new gesture has not been detected in the communications among the user group, then the method 200 may return directly to step 212 (e.g., bypassing step 220). The method 200 may continue to iterate through steps 212-220 until the session of the extended reality application is ended (e.g., by a user of the user group sending a signal to the processing system to end the session, or by all users of the user group leaving the session).

Thus, the method 200 may learn and subsequently "teach" a gesture-based language in an XR environment. In one example, the language may build off universally understood gestures while also including gestures that are customized to a specific group of users. Gestures may be learned, and meanings associated with the gestures used to build a language, through observation of the group of users. When new members join the group of users, the new members' gestures may be observed and corrected (when necessary) to ensure consistency with the established language.

A gesture-based language that is generated in such a manner may be especially useful in XR environments. For instance, individuals who are interacting in an XR environment (and are able to view each or controllable digital representations of each other, such as avatars) may use the gesture-based language to communicate with each other in the XR environment. This may allow groups of users to create personalized "code" language in order to communicate with each other privately in a public or semi-public space. A gesture-based language may also facilitate communication in situations where one or more individuals may be hard of hearing, may have a speech delay or impairment, or may speak a different language from other individuals.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

Furthermore, in some examples, the method 200 may be expanded to include additional steps or capabilities. For instance, in one example, any language library generated according to the method 200 may be saved for use in subsequent sessions of the XR application (or other XR applications). The saved language library may include any customizations and/or new gestures added under guidance from the members of the user group. Metadata associated with the language library may indicate the members of the user group associated with the language library, any specific XR applications associated with the language library, and/or other information. In some examples, the members of the user group may choose to make the language library available for others outside of the user group to use (e.g., in whole, as a starting point for their own personalized language library, or the like).

In another example, the processing system may support a mode whereby a member of the user group can request that the processing system automatically translate the gestures of the other members of the user group, using the language library. For instance, the processing system may use the language library to determine a meaning from a gesture or series of gestures, and may subsequently generate a text, image, or synthesized speech translation of the gesture for output to one or more members of the user group.

In one example where a gesture may be translated into an image, the gesture could be translated into an immersive experience rather than a simple static image. For instance, if a gesture indicates that a user went hiking in the mountains, the processing system may look up images of the hiking trail (e.g., in public data sources such as the Internet or in private data sources such as the user's personal photos, if the user has permitted access). The processing system may utilize the images to generate an XR rendering of the hiking trail, and may augment the XR rendering with audio effects such as the sounds of birds, a waterfall, or the like. The processing system may also be able to generate olfactory effects, such as the scent of pine trees or flowers.

As noted above, a personalized language library generated according to the method 200 may be useful in a variety of XR applications. For instance, in a professional sports context, a personalized language library used among teammates could be used to communicate during a game (e.g., for play calling, discussing which pitches to throw, or the like). In a cooperative gaming context, a personalized language library could similarly be used to communicate privately with other members of one's team. In a family communications context, a personalized language library could be used to communicate line of sight or in order to pass personal messages in a virtual environment where audio may be unavailable (or where one or more users do not wish to use audio to communicate a particular message, such as a "poke" to signal someone to stop talking). In a business context, a personalized language library could be used to remind coworkers about specific items to be discussed during a virtual meeting, or to encourage coworkers to finish up a meeting or to move on to another topic. Examples of the present disclosure could also be used to translate gestures during face to face meetings. In a visual media context (e.g., television or live televised events), examples of the present disclosure may be used to help users who are hard of hearing bypass the need for a sign language interpreter or closed captioning.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a user endpoint dean application server (such as might be used to perform the method 200) or a user endpoint device (such as might be used to communicate with the application server during execution of the method 200) could be implemented as illustrated in FIG. 3.

As depicted in FIG. 3, the system 300 comprises a hardware processor element 302, a memory 304, a module 305 for generating personalized languages for extended reality communication, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for generating personalized languages for extended reality communication may include circuitry and/or logic for performing special purpose functions relating to the allocation of network resources. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for generating personalized languages for extended reality communication (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for generating personalized languages for extended reality communication (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:
1. A method comprising:
creating, by a processing system including at least one processor, a user group in an extended reality application;
creating, by the processing system, a language library for the user group, where the language library includes a plurality of gestures and a plurality of corresponding meanings;
launching, by the processing system, a session of the extended reality application for the user group;
presenting, by the processing system, the language library in the session of the extended reality application;
monitoring, by the processing system, communications among the user group during the session of the extended reality application;
presenting, by the processing system when an error is detected during the monitoring, a correction to a member of the user group who made the error, where the correction shows the member how to correct the error in a manner that is consistent with the language library; and
adding, by the processing system when a new gesture is detected during the monitoring, the new gesture and a corresponding meaning for the new gesture to the language library.

2. The method of claim 1, wherein the user group is created under a direction of a first member of the user group.

3. The method of claim 2, wherein the user group is created for a specific need indicated by the first member.

4. The method of claim 3, wherein the language library is selected from among a plurality of default language libraries based on the specific need.

5. The method of claim 4, wherein the language library is customized, after being selected, to include a gesture for a meaning that is commonly used by the user group.

6. The method of claim 3, wherein the processing system automatically suggests a member of the user group based on the specific need.

7. The method of claim 1, wherein a profile is created for each member of the user group, and wherein the profile for each member of the user group identifies at least one of: contact information for the each member, a name of the each member, an age of the each member, a language spoken by the each member, a relationship of the each member to other members of the user group, or a communication limitation of the each member.

8. The method of claim 1, wherein each gesture of the plurality of gestures includes at least one of: a hand gesture, a facial expression, or a body gesture.

9. The method of claim 1, wherein at least one meaning of the plurality of meanings comprises a haptic output.

10. The method of claim 1, wherein the presenting the language library comprises presenting a legend that shows a top number of most frequently used gestures of the plurality of gestures and corresponding meanings of the plurality of corresponding meanings that correspond to the top number of most frequently used gestures.

11. The method of claim 10, wherein the legend is hidden and presented for a member of the user group upon request from the member.

12. The method of claim 1, wherein the error is detected when a detected gesture is not present in the language library.

13. The method of claim 1, wherein the error is detected when a corresponding meaning of the plurality of corresponding meanings that is mapped to a detected gesture in the language library appears to be contextually inappropriate.

14. The method of claim 1, wherein the error is detected when a member of the user group indicates that the member does not understand a detected gesture.

15. The method of claim 1, wherein the presenting the correction comprises inferring an intended gesture that the member of the user group who made the error intended to make, and showing the member of the user group who made the error how to perform the intended gesture properly.

16. The method of claim 1, wherein the adding includes noting, in the language library, at least one of: which member of the user group created the new gesture, when the new gesture was created, or a context under which the new gesture was created.

17. The method of claim 1, wherein the new gesture is detected for a first time that a member of the user group is detected using a gesture that is not present in the language library.

18. The method of claim 1, wherein the language library is personalized for the user group.

19. A non-transitory computer-readable medium storing instructions which, when executed by a processing system including at least one processor, cause the processing system to perform operations, the operations comprising:
  creating a user group in an extended reality application;
  creating a language library for the user group, where the language library includes a plurality of gestures and a plurality of corresponding meanings;
  launching a session of the extended reality application for the user group;
  presenting the language library in the session of the extended reality application;
  monitoring communications among the user group during the session of the extended reality application;
  presenting, when an error is detected during the monitoring, a correction to a member of the user group who made the error, where the correction shows the member how to correct the error in a manner that is consistent with the language library; and
  adding, when a new gesture is detected during the monitoring, the new gesture and a corresponding meaning for the new gesture to the language library.

20. A device comprising:
a processing system including at least one processor; and
a computer-readable medium storing instructions which, when executed by the processing system, cause the processing system to perform operations, the operations comprising:
  creating a user group in an extended reality application;
  creating a language library for the user group, where the language library includes a plurality of gestures and a plurality of corresponding meanings;
  launching a session of the extended reality application for the user group;
  presenting the language library in the session of the extended reality application;
  monitoring communications among the user group during the session of the extended reality application;
  presenting, when an error is detected during the monitoring, a correction to a member of the user group who made the error, where the correction shows the member how to correct the error in a manner that is consistent with the language library; and
  adding, when a new gesture is detected during the monitoring, the new gesture and a corresponding meaning for the new gesture to the language library.

* * * * *